(12) United States Patent
Kimura et al.

(10) Patent No.: US 9,517,896 B2
(45) Date of Patent: Dec. 13, 2016

(54) CONVEYING APPARATUS

(71) Applicant: MURATA MANUFACTURING CO., LTD., Kyoto-fu (JP)

(72) Inventors: Nobumichi Kimura, Kyoto-fu (JP); Yoji Itagaki, Kyoto-fu (JP); Kazuo Miyake, Kyoto-fu (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 0 days.

(21) Appl. No.: 14/635,355

(22) Filed: Mar. 2, 2015

(65) Prior Publication Data
US 2015/0251860 A1    Sep. 10, 2015

(30) Foreign Application Priority Data

Mar. 4, 2014    (JP) .................................. 2014-041160

(51) Int. Cl.
*B65G 47/26* (2006.01)
*B65G 47/30* (2006.01)
(Continued)

(52) U.S. Cl.
CPC ............... *B65G 47/30* (2013.01); *B65G 37/00* (2013.01); *B65G 47/715* (2013.01); *B65G 43/08* (2013.01)

(58) Field of Classification Search
CPC ..................................................... B65G 47/30
(Continued)

(56) References Cited

U.S. PATENT DOCUMENTS 3,256,863 A * 6/1966 Patz ..................... A01K 5/0208
119/57.5
4,127,861 A   11/1978 Deneuville
(Continued)

FOREIGN PATENT DOCUMENTS

JP    S54-51782 A    4/1979
JP    H05-278836 A   10/1993
(Continued)

OTHER PUBLICATIONS

An Office Action; "Notice of Reason for Rejection," issued by the Japanese Patent Office on Mar. 15, 2016, which corresponds to Japanese Patent Application No. 2014-041160 and is related to U.S. Appl. No. 14/635,355; with English language translation.

*Primary Examiner* — Gene Crawford
*Assistant Examiner* — Lester Rushin
(74) *Attorney, Agent, or Firm* — Studebaker & Brackett PC

(57) ABSTRACT

A conveying apparatus includes first, second, and third conveying sections, and a controller. The first and second conveying sections include first and second conveying mechanisms configured to convey workpieces at first and second speeds, respectively. The third conveying section includes a third conveying mechanism, a rotation mechanism, and a first sensor. The third conveying mechanism is in a form of a slide and positioned between the first and second conveying mechanisms. The third conveying mechanism is configured to allow the workpieces dropped thereon from the first conveying mechanism to slide to be transferred onto the second conveying mechanism. The rotation mechanism is configured to turn the third conveying mechanism about a rotation shaft. The first sensor is configured to detect first information indicating that the workpieces have passed the second end portion of the third conveying mechanism. The controller is coupled to the first sensor and the rotation mechanism.

4 Claims, 10 Drawing Sheets

(51) Int. Cl.
*B65G 37/00* (2006.01)
*B65G 47/71* (2006.01)
*B65G 43/08* (2006.01)

(58) Field of Classification Search
USPC ......... 198/358, 369.5, 370.1, 437, 444, 575,
198/600, 861.6
See application file for complete search history.

(56) References Cited

U.S. PATENT DOCUMENTS

| | | | | |
|---|---|---|---|---|
| 4,682,385 | A * | 7/1987 | Kasai | A22C 15/001 452/51 |
| 7,318,722 | B2 * | 1/2008 | Drysdale | B65G 47/648 198/363 |
| 8,955,664 | B2 * | 2/2015 | Lim | B65G 47/644 198/369.5 |
| 2003/0075416 | A1 * | 4/2003 | Prutu | B07C 1/10 198/370.1 |
| 2011/0048649 | A1 * | 3/2011 | Komatsu | B23P 19/069 157/1.35 |
| 2013/0105280 | A1 * | 5/2013 | Warecki | B65B 5/103 198/575 |

FOREIGN PATENT DOCUMENTS

| | | |
|---|---|---|
| JP | H10-109740 A | 4/1998 |
| JP | 2004-250037 A | 9/2004 |
| JP | 2012-055859 A | 3/2012 |
| JP | 2014-024623 A | 2/2014 |

* cited by examiner

CONVEYING APPARATUS

CROSS REFERENCE TO RELATED APPLICATIONS

This application claims benefit of priority to Japanese Patent Application No. 2014-041160 filed Mar. 4, 2014, the entire content of which is incorporated herein by reference.

TECHNICAL FIELD

The present technical field relates to a conveying apparatus configured to convey a workpiece (an object to be conveyed).

BACKGROUND

A sorting apparatus is configured to sort defective workpieces failing to satisfy predetermined conditions and remove the defective workpieces. Such a sorting apparatus includes a conveying apparatus for conveying workpieces from a supplying mechanism to a detection region.

As an example of the sorting apparatus including a conveying apparatus, FIG. 11 illustrates a sorting apparatus 301 described in Japanese Unexamined Patent Application Publication No. 2012-55859.

In the sorting apparatus 301 in Japanese Unexamined Patent Application Publication No. 2012-55859, workpieces W, which include non-defective workpieces GW and defective workpieces NW, are conveyed from a supplying mechanism 302 to a detection region 303.

The workpieces W are conveyed by a conveying apparatus that includes a conveyer belt 304 and a slide 305 for guiding the workpieces W supplied from the supplying mechanism 302 to the conveyer belt 304.

A vibration mechanism, which is not illustrated, is attached to the slide 305. When the vibration mechanism vibrates the slide 305, the workpieces W travel on the slide 305 to a front end portion of the conveyer belt 304.

The workpieces W are conveyed at a predetermined speed from the front end portion to the rear end portion of the conveyer belt 304 due to travel of the belt.

The workpieces W arriving at the rear end portion of the conveyer belt 304 are discharged into the detection region 303 in accordance with the momentum gained while the workpieces W are conveyed by the conveyer belt 304. The detection region 303 is a space defined between an irradiation source 303a, which applies electromagnetic waves such as visible light or X-ray to the workpieces W, and a receiver 303b.

The electromagnetic waves received by the receiver 303b vary depending on the condition of the workpieces W passing through the detection region 303. The workpieces W are each determined as a non-defective workpiece GW or a defective workpiece NW based on the information of the electromagnetic waves received by the receiver 303b.

In the sorting apparatus 301 in Japanese Unexamined Patent Application Publication No. 2012-55859, the workpieces W are supplied consecutively by the supplying mechanism 302, but the positions of the workpieces W are not adjusted. Thus, the workpieces W may overlap each other on the slide 305 or on the conveyer belt 304.

In such a case, the electromagnetic waves may not be evenly applied to each of the overlapped workpieces W discharged into the detection region 303. This results in inaccurate sorting of the non-defective workpieces GW and the defective workpieces NW.

The above-described problem, which occurs when the overlapped workpieces W are conveyed, may occur on an apparatus other than the sorting apparatus for sorting the non-defective workpieces GW and the defective workpieces NW by applying the electromagnetic waves as described in Japanese Unexamined Patent Application Publication No. 2012-55859.

Workpieces may overlap each other in a sorting apparatus configured to sort defective workpieces by checking the appearance of the workpieces with a camera while the workpieces are conveyed. In such a case, the overlapped parts of the workpieces are not visible. This results in inaccurate sorting of the non-defective workpieces and the defective workpieces.

Workpieces, which include a semi-cured light-curable resin member, may overlap each other in a curing apparatus for curing resin by applying light having a predetermined wavelength to the workpieces being conveyed. In such a case, light may not be applied to the overlapped parts of the workpieces. This results in uneven curing of the resin.

Workpieces may overlap each other in a heat treatment apparatus for heating workpiece members, which are temporally fixed to each other with a thermosetting resin or solder, by using an infrared heater while conveying the workpiece to fix the members to each other. In such a case, the overlapped workpieces may be unevenly heated. This results in uneven fixation strength of the members.

SUMMARY

It is an object of the present disclosure to provide a conveying apparatus, which is used in various processing apparatuses, configured to convey workpieces in an isolated state without overlapping each other.

To provide a conveying apparatus that conveys the workpieces in an isolated state without overlapping each other, according to preferred embodiments of the disclosure, a mechanism for spreading workpieces onto a conveying mechanism of a conveying apparatus and controlling conveying positions of the workpieces on the conveying mechanism is improved.

A conveying apparatus according to a preferred embodiment of the present disclosure includes a first conveying section, a second conveying section, a third conveying section, and a controller.

The first conveying section includes a first conveying mechanism. The first conveying mechanism is configured to convey workpieces in a line from a first end portion to a second end portion of the first conveying mechanism at a first speed.

The second conveying section includes a second conveying mechanism. The second conveying mechanism is configured to convey workpieces from a first end portion to a second end portion of the second conveying mechanism at a second speed.

The third conveying section includes a third conveying mechanism, a rotation mechanism, and a first sensor. The third conveying mechanism is in a form of a slide and positioned between the second end portion of the first conveying mechanism and the first end portion of the second conveying mechanism. The third conveying mechanism is configured to allow the workpieces, which are dropped thereon from the second end portion of the first conveying mechanism, to slide from a first end portion of the third conveying mechanism to a second end portion of the third conveying mechanism such that the workpieces are transferred to the first end portion of the second conveying mechanism. The rotation mechanism has a rotation shaft connected to the third conveying mechanism at a position near the first end portion of the third conveying mechanism. The rotation mechanism is configured to turn the third conveying mechanism about the rotation shaft. The first sensor is configured to detect first information indicating that one of the workpieces has passed the second end portion of the third conveying mechanism.

The controller is coupled to the first sensor and the rotation mechanism.

The controller is configured to receive the first information detected by the first sensor. The controller is configured to transmit an operation command to the rotation mechanism based on the first information to turn the second end portion of the third conveying mechanism a predetermined number of degrees at a peripheral speed faster than the first speed.

The rotation mechanism is configured to intermittently turn the third conveying mechanism based on the operation command such that the workpieces slid to the second end portion of the third conveying mechanism from the first end portion of the third conveying mechanism are spread onto the second conveying mechanism with a predetermined distance therebetween.

In the above-described conveying apparatus, the rotation mechanism intermittently turns the third conveying mechanism based on the first information indicating that one of the workpieces has passed the second end portion of the third conveying mechanism.

After one of the workpieces has passed the second end portion of the third conveying mechanism, the third conveying mechanism will have turned clockwise or counterclockwise a predetermined number of degrees by the time the next workpiece passes the second end portion.

With this configuration, the workpiece slid from the first end portion to the second end portion of the third conveying mechanism is transferred onto the first end portion of the second conveying mechanism at a position different from a position where a workpiece immediately preceding the workpiece was transferred. The workpieces are positioned with a predetermined distance therebetween. In other words, the controller controls the conveying positions of the workpieces on the second conveying mechanism by intermittently turning the third conveying mechanism through the rotation mechanism based on the first information.

In the conveying apparatus according to the preferred embodiment of the present disclosure, the workpieces are spread on the second conveying mechanism without overlapping each other. This enables a process to be efficiently performed on the workpieces that are being conveyed on the second conveying mechanism, since the problem due to the overlapped workpieces will not occur.

The conveying apparatus according to the preferred embodiment of the present disclosure may further include a workpiece guide including a guide body and a plurality of through holes in the guide body.

The guide body is positioned between the second end portion of the third conveying mechanism and the first end portion of the second conveying mechanism. The through holes extend through the guide body at least from an upper surface of the guide body to a lower surface thereof or from the upper surface thereof to a side surface thereof. The through holes are arranged in a substantially arced shape with a predetermined distance therebetween when viewed from above.

The rotation mechanism is configured to intermittently turn the third conveying mechanism based on the above-described operation command such that the second end portion of the third conveying mechanism is positioned close to each of the through holes and the workpieces that have passed the second end portion of the third conveying mechanism are distributed into the through holes.

In the above-described conveying apparatus, the rotation mechanism intermittently turns the third conveying mechanism based on the first information such that each of the workpieces enter each of the through holes of the workpiece guide one by one.

The workpiece dropped from the second end portion of the third conveying mechanism passes through one of the through holes of the workpiece guide to be transferred onto a position of the first end portion of the second conveying mechanism.

By the time the next workpiece drops, the second end portion of the third conveying mechanism will have turned clockwise or counterclockwise a number of degrees along one through hole so as to be positioned close to a through hole different from one through which the immediately preceding workpiece passed.

Thus, the next workpiece passes through the through hole adjacent to the through hole through which the immediately preceding workpiece has passed, and the next workpiece is transferred onto the first end portion of the second conveying mechanism at a position different from the position where the immediately preceding workpiece was transferred. In other words, the controller controls the conveying positions of the workpieces on the second conveying mechanism by intermittently turning the third conveying mechanism through the rotation mechanism based on the first information.

With this configuration, in the conveying apparatus according to the preferred embodiment of the present disclosure, the workpieces being transferred from the third conveying mechanism to the second conveying mechanism do not bounce on the second conveying mechanism. Thus, the workpieces do not overlap each other and reliably spread onto the second conveying mechanism. This enables a process to be efficiently performed on the workpieces that are being conveyed on the second conveying mechanism, since the problem due to overlapped workpieces will not occur.

In the conveying apparatus according to the preferred embodiment of the present disclosure, the first conveying section may further include a supply mechanism configured to supply the workpieces to the first conveying mechanism.

The supply mechanism is coupled to the controller. The controller is configured to transmit an operation command to the supply mechanism based on the first information transmitted from the first sensor to supply the workpieces to the first conveying mechanism. Accordingly, the controller controls supply of the workpieces to the first conveying mechanism.

In the above-described conveying apparatus, based on the first information indicating that the workpiece has passed the second end portion of the third conveying mechanism, the controller activates the supply mechanism to supply the workpiece stored in the supply mechanism onto the first conveying mechanism.

As a result, the workpieces are supplied to the first conveying mechanism by the supplying mechanism with a predetermined distance therebetween. The distance is determined by multiplying the time interval between two consecutive workpieces dropping from the second end portion of the first conveying mechanism, and the first speed.

Accordingly, after one of the workpieces has passed through one of the through holes, there is enough time for the second end portion of the third conveying mechanism to properly turn clockwise or counterclockwise a number of degrees along one through hole by the time the next one of the workpieces arrives at the third conveying mechanism.

Thus, the next workpiece reliably passes through the through hole adjacent to the through hole through which the immediately preceding workpiece has passed, and the next workpiece is reliably transferred onto the first end portion of the second conveying mechanism at a position different from the position where the immediately preceding workpiece was transferred.

In the conveying apparatus according to the preferred embodiment of the present disclosure, the first conveying section may further include a second sensor and a removing mechanism configured to remove any of the workpieces desired to be removed from the first conveying mechanism.

The second sensor is configured to detect second information indicating that one of the workpieces has passed a predetermined position of the first conveying mechanism. The second sensor and the removing mechanism are coupled to the controller.

If the controller receives the second information, which is transmitted from the second sensor, at a shorter time interval than a predetermined time interval, the controller transmits an operation command to the removing mechanism to remove one of the workpieces that has passed the predetermined position at the shorter time interval than the predetermined time interval. In this way, the controller controls the distance between the workpieces on the first conveying mechanism.

In the above-described conveying apparatus, if the second information indicates that the distance between the workpieces on the first conveying mechanism is smaller than the predetermined distance, the controller activates the removing mechanism to remove the workpiece that is not spaced at the predetermined distance on the first conveying mechanism.

The removing mechanism removes the workpiece that is not spaced at the predetermined distance if the distance between the workpieces on the first conveying mechanism is smaller than the predetermined distance for some reason. Thus, the distance between the workpieces being conveyed is reliably made to be not smaller than the predetermined distance.

Accordingly, after one of the workpieces has passed through one of the through holes, there is enough time for the second end portion of the third conveying mechanism to properly turn clockwise or counterclockwise a number of degrees along one through hole by the time the next one of the workpieces arrives from the third conveying mechanism.

The workpiece reliably passes through one of the through holes adjacent to one of the through holes through which the workpiece immediately preceding the workpiece has passed. Thus, the workpiece is reliably transferred onto the first end portion of the second conveying mechanism at a position different from the position where the workpiece immediately preceding the workpiece was transferred.

Other features, elements, characteristics and advantages of the present disclosure will become more apparent from the following detailed description of preferred embodiments of the present disclosure with reference to the attached drawings.

DETAILED DESCRIPTION

Hereinafter, preferred embodiments of the present disclosure will be described to explain characteristics of the present disclosure in detail.

First Embodiment

Figure 2:
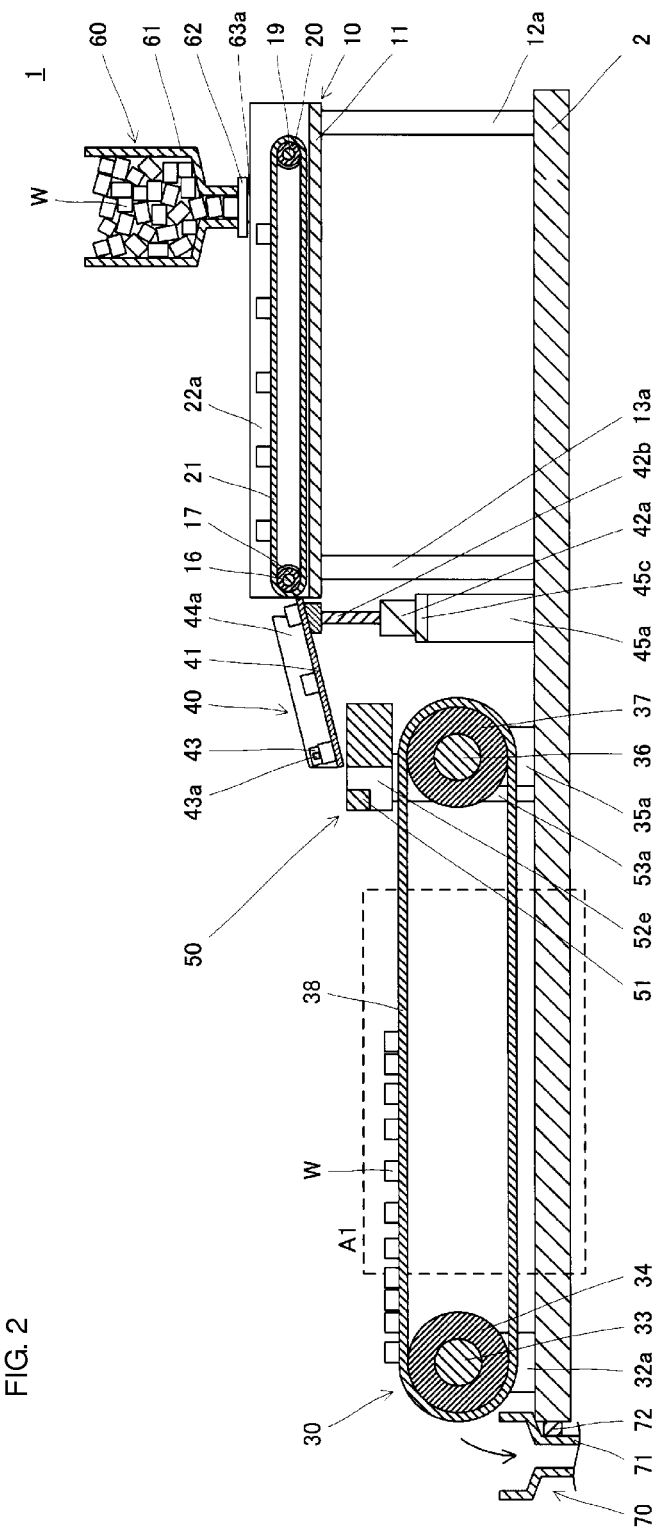
FIG. 2 is a cross-sectional view of the conveying apparatus taken along a line 2-2 in FIG. 1.
Figure 3:
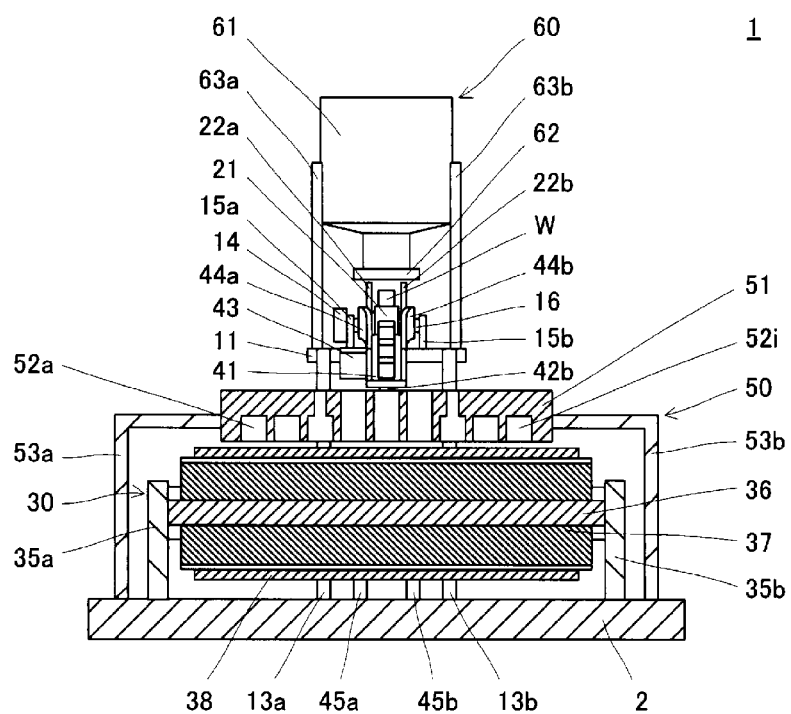
FIG. 3 is a cross-sectional view of the conveying apparatus taken along a line 3-3 in FIG. 1.

A conveying apparatus 1 according to a first embodiment of the disclosure will be described with reference to FIG. 1 to FIG. 3.

Figure 1:
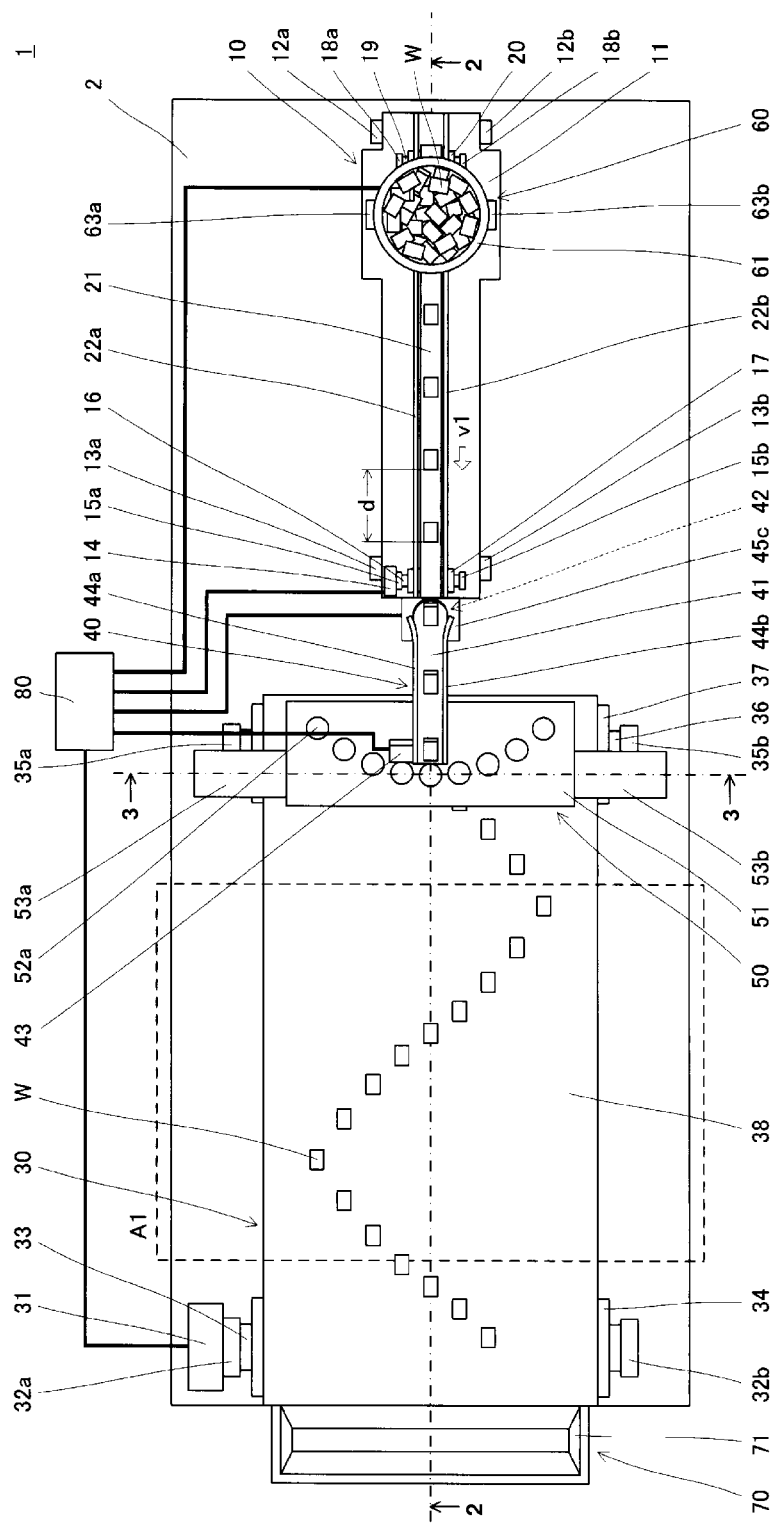
FIG. 1 is a top view of a conveying apparatus according to a first embodiment of the present disclosure.

FIG. 1 is a top view of the conveying apparatus 1 according to the first embodiment of the disclosure. FIGS. 2 and 3 are cross-sectional views of the conveying apparatus 1 taken along lines 2-2 and 3-3, respectively, in FIG. 1.

The conveying apparatus 1 includes a base 2, first, second, and third conveying sections 10, 30, 40 for conveying the workpieces W, a workpiece guide 50, a supplying mechanism 60, a workpiece collection portion 70, and a controller 80.

Base

In the conveying apparatus, the first conveying section 10, the second conveying section 30, the third conveying section 40, the workpiece guide 50, the supplying mechanism 60, and the workpiece collection portion 70 are directly or indirectly mounted on an upper surface or an end surface of the base 2. The controller 80 may also be mounted on an upper surface or an end surface of the base 2.

First Conveying Section

The first conveying section 10 includes a first conveying mechanism. The first conveying mechanism conveys the workpieces W from a first end portion to a second end portion of the first conveying mechanism at a first speed v1. The first conveying mechanism is mounted on an upper surface of an auxiliary base 11 that is supported by supporting members 12a, 12b, 13a, and 13b on an upper surface of the base 2.

The first conveying mechanism includes a first drive mechanism 14, a first drive shaft 16, a first drive pulley 17, a first driven shaft 19, a first driven pulley 20, and a first belt 21.

The first drive mechanism 14 and the first drive shaft 16 are supported on the upper surface of the auxiliary base 11 by supporting members 15a, 15b. The first driven shaft 19 is supported on the upper surface of the auxiliary base 11 by supporting members 18a, 18b.

The first drive mechanism 14 is configured to drive the first drive shaft 16. The first drive pulley 17 has a substantially cylindrical shape, which is centered in line with the first drive shaft 16, and is fixed to the first drive shaft 16. The first driven pulley 20 also has a substantially cylindrical shape, which is centered in line with the first driven shaft 19, and is fixed to the first driven shaft 19.

The first belt 21 is wound around the first drive pulley 17 and the first driven pulley 20. The first belt 21 has a width that allows only one workpiece W to be placed and conveyed thereon in the width direction.

The first drive pulley 17 is rotated by the first drive mechanism 14. Rotation of the first drive pulley 17 rotates the first belt 21, and rotation of the first belt 21 rotates the first driven pulley 20.

With this configuration, the first conveying mechanism conveys the workpieces W in a line from the first end portion to the second end portion of the first conveying mechanism at the first speed v1. The shape of the workpieces W may have an orientation, but the workpieces W may be oriented in different directions.

In this embodiment, the first drive mechanism 14 is coupled to the controller 80 through a signal line so as to be activated or stopped by the controller 80. However, the first drive mechanism 14 may be configured to be activated or stopped independently without being coupled to the controller 80.

The first conveying section 10 preferably includes conveying guides 22a, 22b on the upper surface of the auxiliary base 11 to prevent the workpieces W from dropping off a side of the first belt 21 when the workpieces W are conveyed from the first end portion to the second end portion by the first conveying mechanism.

Second Conveying Section

The second conveying section 30 includes a second conveying mechanism. The second conveying mechanism conveys the workpieces W from a first end portion to a second end portion of the second conveying mechanism. The second conveying mechanism is placed on the upper surface of the base such that the first end portion of the second conveying mechanism overlaps the second end portion of a third conveying mechanism, which will be described later, when viewed from above.

The second conveying mechanism includes a second drive mechanism 31, a second drive shaft 33, a second drive pulley 34, a second driven shaft 36, a second driven pulley 37, and a second belt 38.

The second drive mechanism 31 and the second drive shaft 33 are supported on the upper surface of the base 2 by the supporting members 32a, 32b. The second driven shaft 36 is supported on the upper surface of the base 2 by the supporting members 35a, 35b.

The second drive mechanism 31 is configured to drive the second drive shaft 33. The second drive pulley 34 has a substantially cylindrical shape, which is centered in line with the second drive shaft 33, and is fixed to the second drive shaft 33. The second driven pulley 37 also has a substantially cylindrical shape, which is centered in line with the second driven shaft 36, and is fixed to the second driven shaft 36.

The second belt 38 is wound around the second drive pulley 34 and the second driven pulley 37. The width of the second belt 38 is not particularly limited.

The second drive pulley 34 is rotated by the second drive mechanism 31. Rotation of the second drive pulley 34 rotates the second belt 38 at a second speed, and rotation of the second belt 38 rotates the second driven pulley 37.

With the above-described configuration, the second conveying mechanism conveys the workpieces W from the first end portion to the second end portion of the second conveying mechanism at the second speed.

In this embodiment, the second drive mechanism 31 is coupled to the controller 80 through a signal line to be activated or stopped by the controller 80. However, the second drive mechanism 31 may be configured to be activated or stopped independently without being coupled to the controller 80.

During conveying of the workpieces on the second conveying mechanism, a process such as appearance check, electromagnetic wave application, or heating is performed on the workpieces in an area A1 of the second conveying mechanism.

Third Conveying Section

The third conveying section 40 includes a third conveying mechanism, a rotation mechanism 42a having a rotation shaft 42b, and a first sensor 43. The third conveying mechanism is in a form of a slide 41 positioned between the second end portion of the first conveying mechanism and the first end portion of the second conveying mechanism. The third conveying mechanism is configured to allow the workpieces W, which are dropped thereon from the second end portion of the first conveying mechanism, to slide from a first end portion to a second end portion thereof such that the workpieces W are transferred onto the first end portion of the second conveying mechanism.

The first end portion of the slide 41 may be in a substantially round shape having a larger diameter than a width of the second end portion. With this configuration, the third conveying mechanism reliably receives the workpieces W from the second end portion of the first conveying mechanism when the third conveying mechanism turns, which will be described later.

The third conveying section 40 includes slide guides 44a, 44b on the upper surface of the slide 41 to prevent the workpieces W, which are slid from the first end portion to the second end portion of the third conveying mechanism, from dropping off the side of the slide 41.

The rotation mechanism 42 placed on the supporting members 45c is mounted on the upper surface of the base 2 through the supporting members 45a, 45b. One end of the rotation shaft 42b is connected to the slide 41 at a position near the first end portion of the slide 41.

The rotation mechanism 42a is coupled to the controller 80 through a signal line. FIG. 1 does not illustrate how the rotation mechanism 42a is coupled to the controller 80, because the rotation mechanism 42a is not illustrated. The rotation mechanism 42a, as will be described later, turns the second end portion of the third conveying mechanism a predetermined number of degrees at a peripheral speed faster than a first speed v1, by an operation command transmitted from the controller 80 based on the first information.

The rotation mechanism 42a may be a motor including a rotary encoder.

The first sensor 43 detects the first information indicating that the workpiece W, which slides on the third conveying mechanism, has passed the second end portion of the third conveying mechanism.

The first sensor 43 is disposed on the second end portion of the third conveying mechanism. The first sensor 43 is configured to detect the workpiece W that is dropped from the second end portion of the third conveying mechanism and is entering one of the through holes 52a to 52i in the workpiece guide 50, which will be described later. The first sensor 43 is coupled to the controller 80 through a signal line. As will be described later, the first sensor 43 transmits the first information to the controller 80.

The first sensor 43 may be a reflective photoelectric sensor that includes a light emitting section 43a and a detection section 43b, which is not illustrated, as one component. This enables non-contact detection of each of the workpieces W passing the second end portion of the third conveying mechanism.

The first sensor 43 may be a transmissive photoelectric sensor that includes the light emitting section 43a and the detection section 43b as separate components.

Workpiece Guide

The workpiece guide 50 includes the guide body 51 and a plurality of through holes 52a to 52i in the guide body 51.

The guide body 51 is supported on the upper surface of the base 2 by the supporting members 53a, 53b so as to be positioned between the second end portion of the third conveying mechanism and the first end portion of the second conveying mechanism.

The guide body 51 will be described in detail with reference to FIG. 4A to 4C.

Figure 4A:
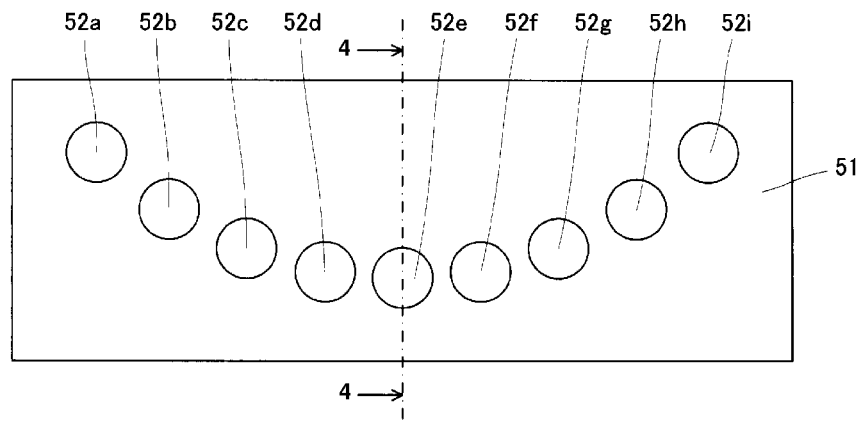
FIG. 4A is a top view illustrating an appearance of a guiding body of a workpiece guide.
Figure 4B:
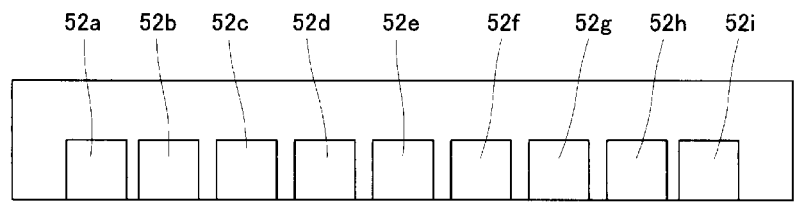
FIG. 4B is a side view illustrating the appearance of the guiding body of the workpiece guide.
Figure 4C:
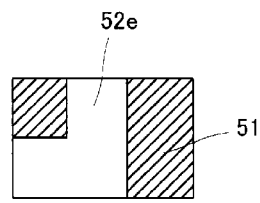
FIG. 4C is a cross-sectional view taken along a line 4-4 in FIG. 4A.

As illustrated in FIG. 4A, the through holes 52a to 52i are arranged in a substantially arced shape with a predetermined distance therebetween when viewed from above the guide body 51. As illustrated in FIG. 4A to 4C, the through holes 52a to 52i bend at a substantially right angle in the guide body 51. The through holes 52a to 52i extend through the guide body 51 from the upper surface to the lower surface and to the side surface.

Figure 4D:
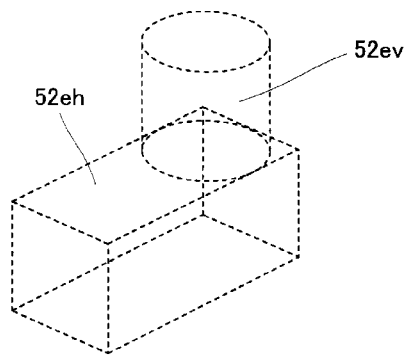
FIG. 4D is a perspective view of one through hole as an example of through holes in the guide body.

As an example of the through holes, the shape of the through hole 52e will be described. As illustrated in FIGS. 4C and 4D, the through hole 52e is formed of a vertical hole 52ev and a horizontal hole 52eh. The vertical hole 52ev extends downward from the upper surface of the guide body 51 to a predetermined depth. The horizontal hole 52eh communicates with the vertical hole 52ev and opens at the side surface and the lower surface of the guide body 51. In the first embodiment, the vertical hole 52ev has a substantially cylindrical shape and the horizontal hole 52eh has a substantially rectangular column shape.

As described above, the guide body 51 is positioned between the second end portion of the third conveying mechanism and the first end portion of the second conveying mechanism such that the workpieces W dropped from the second end portion of the third conveying mechanism pass directly through any one of the through holes 52a to 52i.

With the above-described configuration, the workpieces W pass through one of the through holes 52a to 52i when the second end portion of the third conveying mechanism is positioned close to one of the through holes 52a to 52i, which allows the workpieces W to be transferred onto the first end portion of the second conveying mechanism. This will be described in further detail later.

Supplying Mechanism

The conveying apparatus 1 preferably includes a supplying mechanism 60. The supplying mechanism 60 is configured to supply the workpieces W to the first conveying mechanism one by one at a predetermined time interval t such that the workpieces W are conveyed on the first conveying mechanism with a predetermined distance d between the workpieces W. The time interval t between supplying workpieces W is determined to be longer than a time required for the second end portion of the third conveying mechanism to move along the arc passing through adjacent through holes of the workpiece guide 50.

The supplying mechanism 60 includes a storage tank 61 and an opening-closing mechanism 62. The storage tank 61 is a substantially cylindrical tube with a bottom configured to store the workpieces W. The opening-closing mechanism 62 is provided at a part of the bottom.

The storage tank 61 is supported on the upper surface of the auxiliary base 11 by supporting members 63a, 63b and positioned above the first conveying mechanism.

The opening-closing mechanism 62 is coupled to the controller 80 through a signal line. FIG. 1 does not illustrate how the opening-closing mechanism 62 is coupled to the controller 80, because the opening-closing mechanism 62 is not illustrated. The controller 80 transmits an operation command to the supplying mechanism 60, based on the received first information, to supply the workpieces W to the first conveying mechanism. In this way, the controller 80 controls supply of the workpieces W to the first conveying mechanism.

Workpiece Collection Portion

The conveying apparatus 1 preferably includes the workpiece collection portion 70 configured to collect the workpieces W dropped from the second end portion of the second conveying mechanism. The workpieces W are collected after being subjected to a process in the area A1 of the second conveying mechanism.

The workpiece collection portion 70 includes a collection tank 71. The collection tank 71 has a box-like shape and has an opening at a part of a bottom thereof. The opening allows the collected workpieces W to be transferred for a taping process.

The collection tank 71 is supported on the side surface of the base 2 by a support 72 and positioned close to the second end portion of the second conveying mechanism.

Controller

The controller 80 is coupled to the first sensor 43 and the rotation mechanism 42a through a signal line. The controller 80 receives the first information transmitted from the first sensor 43. The controller 80 transmits the operation command to the rotation mechanism 42a, based on the first information, to turn the second end portion of the third conveying mechanism a predetermined number of degrees at a peripheral speed faster than the first speed v1.

In other words, the first information is intermittently transmitted to the controller 80 every time the workpiece W passes the first sensor 43. Every time the controller 80 receives the first information, the controller 80 transmits the operation command to the rotation mechanism 42a. The rotation mechanism 42a intermittently turns the third conveying mechanism based on the operation command.

The controller 80 intermittently turns the third conveying mechanism such that the second end portion of the third conveying mechanism comes close to each of the through holes 52a to 52i and the workpieces W dropped from the second end portion of the third conveying mechanism are spread onto the third conveying mechanism. In this way, the controller 80 controls the conveying position of the workpieces W on the second conveying mechanism.

In the conveying apparatus 1 including the supplying mechanism 60, the controller 80 is coupled to the opening-closing mechanism 62 through a signal line. In this case, the controller 80 transmits the operation command to the supplying mechanism 60 based on the first information transmitted from the first sensor 43 to supply workpieces W to the first conveying mechanism. In this way, the controller 80 controls supply of the workpieces W to the first conveying mechanism.

The controller 80 may be coupled to the first drive mechanism 14 and the second drive mechanism 31 through a signal line.

Operation of the Third Conveying Section

Operation of the third conveying section 40 according to the first embodiment of the disclosure will be described with reference to FIG. 5 and FIGS. 6A to 6D.

Figure 5:
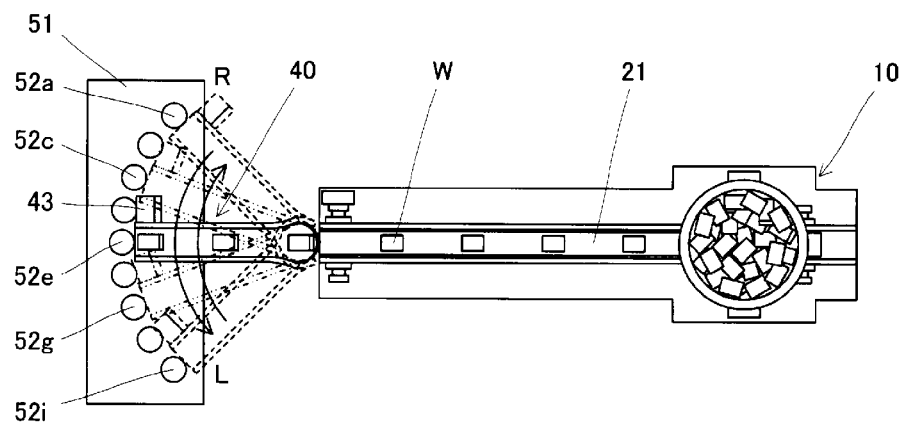
FIG. 5 is a top view schematically illustrating that a third conveying mechanism intermittently moves such that a second end portion thereof comes close to each of the through holes of the workpiece guide in sequence.

FIG. 5 is a top view schematically illustrating that the third conveying mechanism intermittently turns about the rotation shaft 42b, which is not illustrated. In FIG. 5, temporary positions (positions R and L) of the third conveying mechanism are indicated by a dotted line. At the position R, the second end portion is positioned close to the through hole 52a. At the position L, the second end portion is positioned close to the through hole 52i. The second end portion of the third conveying mechanism temporarily comes close to each of the through holes 52a to 52i in sequence, as indicated by a two-dotted chain line in FIG. 5, and moves between the position R and the position L, as indicated by an arrow.

FIG. 6A to FIG. 6D are top views schematically illustrating that the second end portion of the third conveying mechanism comes close to each of the through holes in sequence.

Hereinafter, it will be described how the intermittent turn of the third conveying mechanism enables the workpieces W to enter each of the through holes 52a to 52i in sequence and to spread onto the second conveying mechanism without overlapping each other.

Figure 6A:
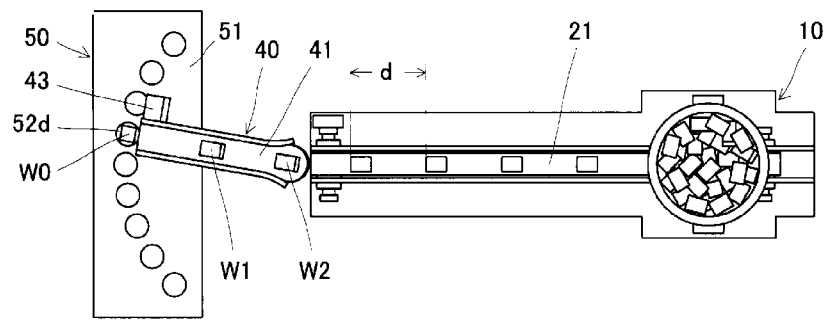
FIG. 6A is a top view schematically illustrating that the second end portion of the third conveying mechanism is positioned close to the first through hole and the first workpiece is passing through the first through hole.

FIG. 6A illustrates that the second end portion of the third conveying mechanism is positioned close to the through hole 52d. In FIG. 6A, the workpieces W0 are passing through the through hole 52d after being passed and dropped from the second end portion of the third conveying mechanism. On the first conveying mechanism (the first belt 21), the subsequent workpiece W1 is conveyed at the first speed v1 with the predetermined distance d between the workpieces W0 and W1.

The first sensor 43 detects that the workpiece W0 has passed the second end portion of the third conveying mechanism, and the detection result as the first information is transmitted to the controller 80, which is not illustrated.

Based on the first information, the controller 80 transmits the operation command to the rotation mechanism 42a, which is not illustrated, to turn the second end portion of the third conveying mechanism at a peripheral speed r1 faster than the first speed v1, to a position close to the through hole 52e.

To ensure that the third conveying mechanism turns after the workpiece W0 has passed the through hole 52d, the controller 80 transmits the operation command to the rotation mechanism 42a after a predetermined time has elapsed since receiving the first information.

Figure 6B:
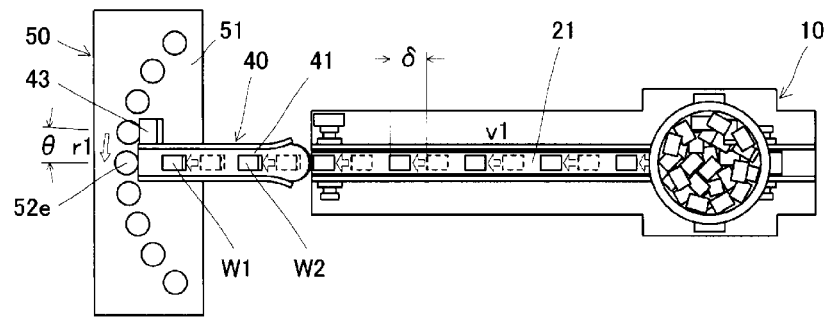
FIG. 6B is a top view schematically illustrating that the second end portion of the third conveying mechanism is positioned close to the second through hole due to the turn of the third conveying mechanism after the first workpiece passed through the first through hole.

FIG. 6B illustrates that the rotation mechanism 42a, which has received the operation command from the controller 80, turns the third conveying mechanism such that the second end portion of the third conveying mechanism comes close to through hole 52e after the workpieces W0 has passed the through hole 52d.

From the state in FIG. 6A to the state in FIG. 6B, the third conveying mechanism turns a degree θ along the arc at the peripheral speed r1. During the turn of the third conveying mechanism, the workpiece W1 travels the distance δ on the first conveying mechanism at the first speed v1.

As described above, the time interval t between the supplies of the workpieces W by the supplying mechanism 60 is set to be longer than the time required for the second end portion of the third conveying mechanism to turn the degree θ along the arc passing through the adjacent through holes of the workpiece guide 50. The predetermined distance d is determined by multiplying the time interval t by the first speed v1. The peripheral speed r1 of the second end portion of the third conveying mechanism is set to be faster than the first speed v1.

In this configuration, the workpiece W1 passes the second end portion of the third conveying mechanism and drops from the third conveying mechanism after the second end portion of the third conveying mechanism is moved away from the position close to the through hole 52d to the position close to the through hole 52e through which the workpiece W1 is going to pass.

Figure 6C:
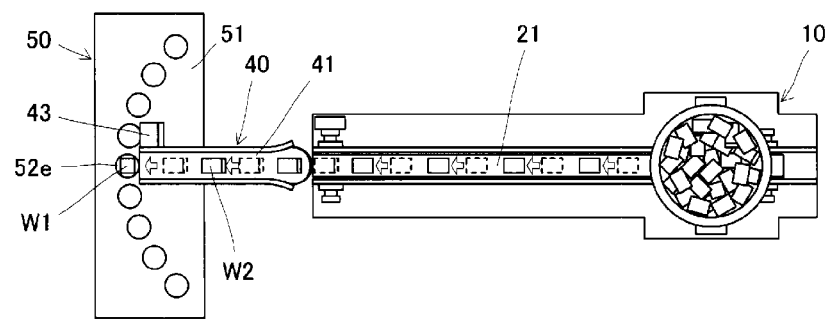
FIG. 6C is a top view schematically illustrating that the second workpiece is passing through the second through hole in the state in FIG. 6B.

FIG. 6C illustrates a state after the state in FIG. 6B. In FIG. 6C, the workpiece W1 is passing through the through hole 52e. On the first conveying mechanism, the next workpiece W2 is conveyed at the first speed v1 with the predetermined distance d between the workpieces W1 and W2.

As in the case in FIG. 6A, the first sensor 43 detects that the workpiece W1 has passed the second end portion of the third conveying mechanism. The detection result as the first information is transmitted to the controller 80, which is not illustrated.

Based on the first information, the controller 80 transmits the operation command to the rotation mechanism 42a, which is not illustrated, to turn the second end portion of the third conveying mechanism to a position close to the through hole 52f at the peripheral speed r1 faster than the first speed v1.

Figure 6D:
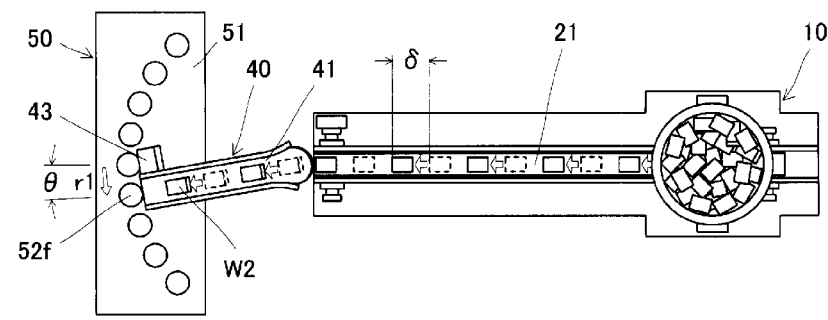
FIG. 6D is a top view schematically illustrating that the second end portion of the third conveying mechanism is positioned close to the third through hole due to the turn of the third conveying mechanism after the second workpiece passed through the second through hole.

FIG. 6D illustrates that the rotation mechanism 42a, which received the operation command from the controller 80, turned the third conveying mechanism, after the workpiece W1 has passed through the through hole 52e. The second end portion of the third conveying mechanism is positioned close to the through hole 52f.

As in the case in FIG. 6B, from the state in FIG. 6C to the state in FIG. 6D, the third conveying mechanism turned the degree θ along the arc at the peripheral speed r1. During the turn of the third conveying mechanism, the workpiece W2 travels the distance δ on the first conveying mechanism at the first speed v1.

The workpiece W2 passes the second end portion of the third conveying mechanism and drops from the third conveying mechanism after the second end portion of the third conveying mechanism is moved away from the position close to the through hole 52e to the position close to the through hole 52f through which the workpiece W2 is going to pass.

The controller 80 repeatedly transmits the above-described operation command to the rotation mechanism 42a based on the first information. After the workpieces W pass through the through holes 52a and 52i, the controller 80 transmits an operation command to the rotation mechanism 42a to turn the third conveying mechanism in an opposite direction.

With this configuration, the third conveying mechanism intermittently turns about the rotation shaft 42b. Thus, the second end portion of the third conveying mechanism turns to come close to each of the through holes 52a to 52i, as illustrated in FIG. 5.

By the above-described operation, the workpieces W dropped from the second end portion of the third conveying mechanism are distributed into each of the through holes 52a to 52i in the workpiece guide 50.

Then, the workpiece W dropped from the second end portion of the third conveying mechanism passes through one of the through holes 52a to 52i in the workpiece guide 50 such that the workpiece W is transferred onto the first end portion of the second conveying mechanism.

By the time the next workpiece W drops, the third conveying mechanism will have turned clockwise or counterclockwise a number of degrees along one through hole. Thus, the next workpiece W passes through the through hole adjacent to the through hole through which the immediately preceding workpiece W has passed. The next workpiece W is transferred onto the first end portion of the second conveying mechanism at a position different from the position where the immediately preceding workpiece W was transferred.

In the conveying apparatus 1 according to the first embodiment, with the above-described configuration, the workpieces W are spread on the second conveying mechanism without overlapping each other.

The controller 80 controls the conveying positions of the workpieces W on the second conveying mechanism by the above-described control and operation.

In this way, a process is efficiently performed to the workpieces W that are being conveyed on the second conveying mechanism, since the problem due to the overlapped workpieces will not occur.

The conveying apparatus 1 according to the preferred embodiment of the disclosure may be configured such that the second end portion of the third conveying mechanism intermittently turns so as to come close to every predetermined number of the through holes 52a to 52i in the workpiece guide 50. The second end portion of the first conveying mechanism may intermittently turn so as to come close to every second through hole 52a, 52c, 52e, 52g, and 52i. In this case, the distance between the workpieces W in the conveying direction and in the width direction are made sufficiently large.

Since the conveying apparatus 1 according to the first embodiment has the above-described configuration, in a sorting apparatus including the conveying apparatus 1, the appearance of each of the workpieces W is reliably checked with a camera, for example, during conveying.

Second Embodiment

Figure 7:
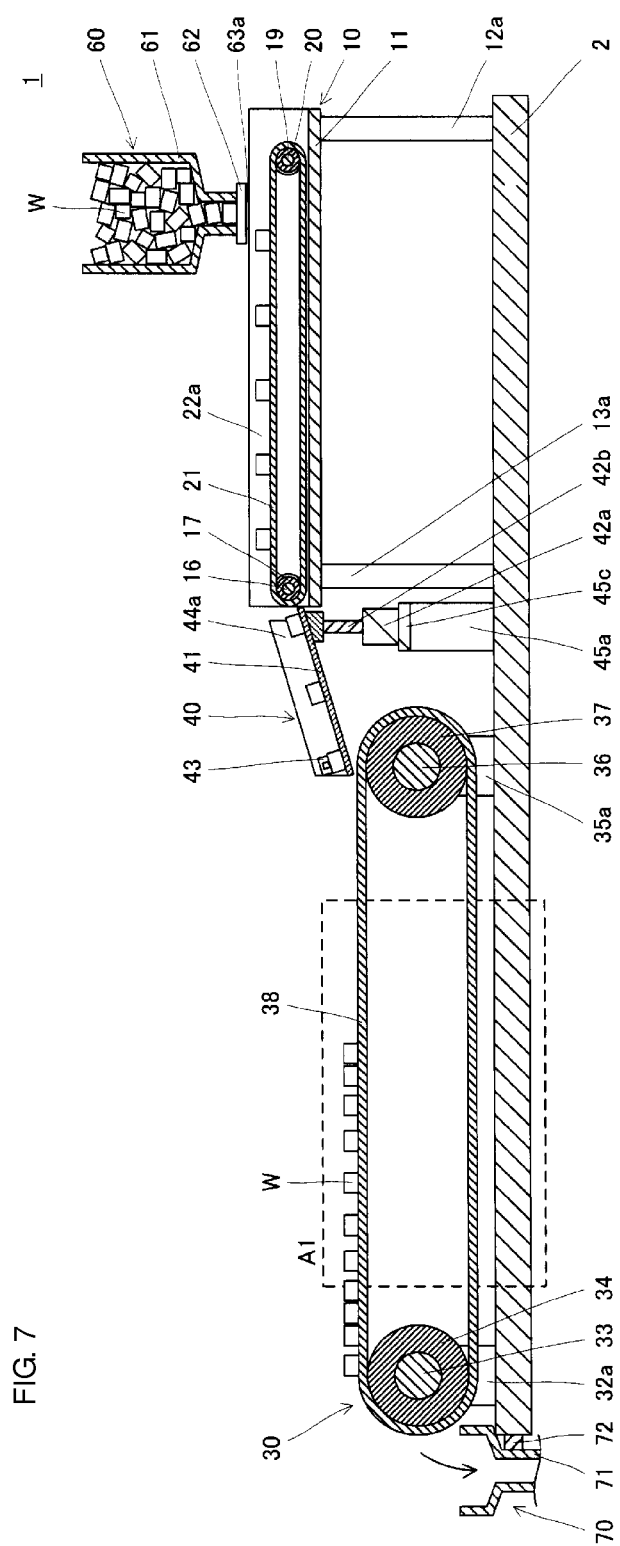
FIG. 7 is a cross-sectional view of a conveying apparatus according to a second embodiment of the disclosure, which corresponds to the cross-sectional view in FIG. 2 illustrating the conveying apparatus according to the first embodiment taken along the line 2-2.

A conveying apparatus 1 according to a second embodiment of the disclosure will be described with reference to FIG. 7. FIG. 7 is a cross-sectional view illustrating the conveying apparatus 1 according to the second embodiment of the disclosure and corresponding to the cross-sectional view in FIG. 2.

The conveying apparatus 1 according to the second embodiment does not include the workpiece guide 50 that is one of the components in the first embodiment. The other components of the conveying apparatus 1 in this embodiment are the same as those in the first embodiments, and will not be described.

The second embodiment can be employed in a conveying apparatus with little difference between height positions of the first conveying mechanism and the second conveying mechanism on the upper surface of the base 2. If there is a large difference between the height positions of the first and second conveying mechanisms, the third conveying mechanism in the form of the slide 41 would have a large angle of inclination. Thus, the workpieces W transferred directly from the third conveying mechanism onto the second conveying mechanism may bounce and overlap each other on the second conveying mechanism. In the first embodiment, the workpiece guide 50 is provided to prevent the workpieces W from bouncing on the second conveying mechanism and from overlapping each other.

If there is little difference between the height positions of the first and second conveying mechanisms, the workpieces W transferred directly from the third conveying mechanism to the second conveying mechanism do not bounce on the second conveying mechanism and spread on the second conveying mechanism without overlapping each other.

In this case, the conveying apparatus 1 does not need the workpiece guide 50 having the through holes 52a to 52i that are high-precision machined. Thus, the number of components of the conveying apparatus 1 can be reduced, which results in reduction in a manufacturing cost of the conveying apparatus 1.

Third Embodiment

A main part of a conveying apparatus 1 according to a third embodiment of the disclosure will be described with reference to FIGS. 8A and 8B. The other parts of the conveying apparatus 1 in this embodiment are similar to those in the first embodiment, and will not be described.

Figure 8A:
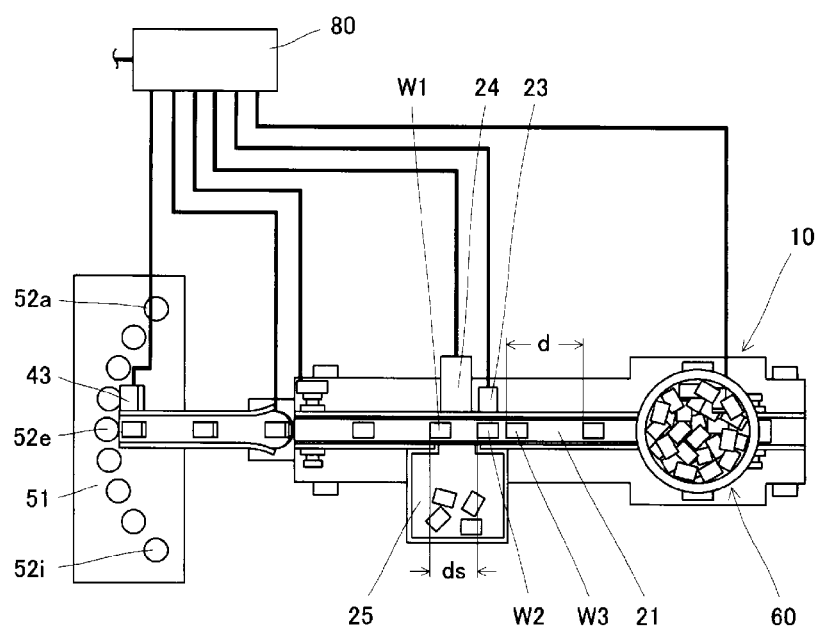
FIG. 8A is a top view illustrating a main part of the conveying apparatus according to a third embodiment of the disclosure and schematically illustrating that a distance between the workpieces is smaller than a predetermined distance.
Figure 8B:
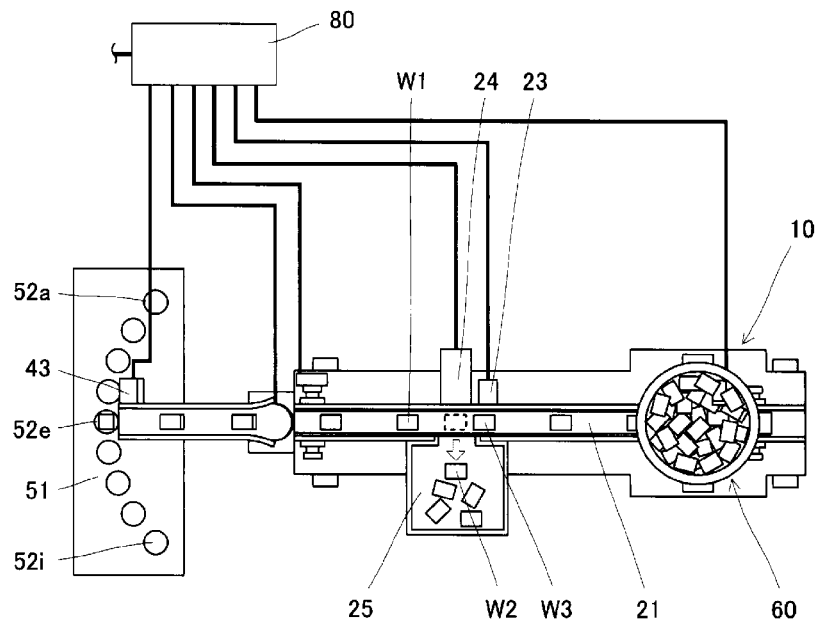
FIG. 8B is a top view illustrating that a removal mechanism has removed the workpiece that was not spaced at the predetermined distance.

FIGS. 8A and 8B are top views illustrating main parts of the conveying apparatus 1 and schematically and sequentially illustrating operations of the conveying apparatus 1 according to the third embodiment of the disclosure. In FIGS. 8A and 8B, a distance between two of the workpieces W supplied by the supplying mechanism 60 is not within the predetermined distance d.

In the conveying apparatus 1 according to the third embodiment, the first conveying section 10 includes a second sensor 23 and a removing mechanism 24 in addition to the components descried in the first embodiment.

Second Sensor

The second sensor 23 detects second information indicating that the workpieces W have passed a predetermined position on the first conveying mechanism. The second sensor 23 is positioned on the auxiliary base 11 at a predetermined position near the first belt 21 such that the second sensor 23 detects the passage of the workpieces W on the first conveying mechanism. The second sensor 23 may be a reflective photoelectric sensor that includes a light emitting section and a detection section as one component as the first sensor 43. This enables non-contact detection of each of the workpieces W transferred from the first end portion to the second end portion of the first conveying mechanism.

The second sensor 23 may be a transmissive photoelectric sensor that includes a light emitting section and a detection section as separate components.

Removing Mechanism

The removing mechanism 24 is configured to remove a workpiece W required to be removed from the first conveying mechanism. The removing mechanism 24 may be an air injecting apparatus, for example, including a compressor for compressing air and a nozzle for injecting the compressed air onto an object. This enables non-contact removal of the workpiece W as the object one by one. The removed workpieces W are collected into a removed workpiece collection portion 25.

Operation of Removing Mechanism

Hereinafter, a case in which the distance between the supplied workpieces W is not within the predetermined distance will be described. The distance between the workpieces W being conveyed is reliably made to be at least the predetermined distance d by the operation of the removing mechanism 24.

As described above, the supplying mechanism 60 supplies the workpieces W at a predetermined time interval t such that the workpieces W are positioned on the first conveying mechanism with a predetermined distance d therebetween. The second sensor 23 detects that the workpieces W have passed a predetermined position of the first conveying mechanism. The detection result as second information is transmitted to the controller 80.

However, as illustrated in FIG. 8A, a distance between the workpiece W1 and the workpiece W2, for example, may be smaller than a predetermined distance ds for some reason.

In such a case, a time interval between a time when the workpiece W1 has passed the second sensor 23 and a time when the next workpiece W2 passed the second sensor 23 is smaller than the time interval set for the predetermined distance d.

In other words, the second information is transmitted to the controller 80 with a shorter time interval than a regular time interval. In this case, the controller 80 transmits an operation command to the removing mechanism 24 to remove the workpiece W2 that has passed the predetermined position before the predetermined time interval.

As illustrated in FIG. 8B, the removing mechanism 24 blows off the workpiece W2 by spraying air, for example, based on the operation command, and removes the workpiece W2 from the first conveying mechanism.

As a result, the distance between the workpiece W1 and the workpiece W3, which was subsequent to the workpiece W2 removed from the first conveying mechanism, is made to be at least the predetermined distance d.

In this way, the controller 80 controls the distance between the workpieces W on the first conveying mechanism.

With the above-described configuration, if the distance between workpieces W on the first conveying mechanism is smaller than the predetermined distance for some reason, the removing mechanism 24 of the conveying apparatus 1 according to the third embodiment removes the workpiece W that is not spaced at the predetermined distance. Thus, the distance between the workpieces W being conveyed is reliably made to be at least the predetermined distance d.

Accordingly, after one of the workpieces W has passed through one of the through holes 52a to 52i in the workpiece guide 50, there is enough time for the third conveying mechanism to properly turn clockwise or counterclockwise a number of degrees along one through hole by the time the next one of the workpieces W arrives at the third conveying mechanism.

The workpiece W reliably passes through the through hole adjacent to the through hole through which the workpiece W immediately preceding the workpiece has passed. Thus, the workpiece W is reliably transferred onto the first end portion of the second conveying mechanism at a position different from the position where the immediately preceding workpiece W was transferred.

Fourth Embodiment

Modifications to the through holes 52a to 52i in the guide body 51 of the workpiece guide 50 according to a fourth embodiment of the disclosure will be described with reference to FIGS. 9A, 9B, 10A, and 10B. The other components in the fourth embodiment are the same as those in the first embodiment, and will not be described.

Figure 9A:
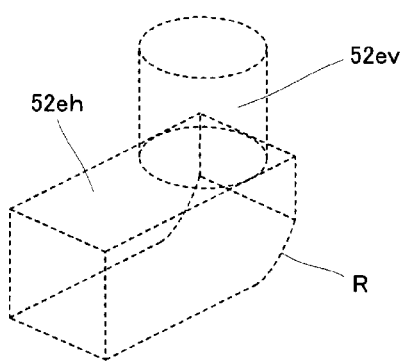
FIG. 9A is a perspective view of a through hole of the through holes in the workpiece guide according to a first modification of a fourth embodiment of the disclosure, the through hole having a curved surface at a part extending in a horizontal direction.
Figure 9B:
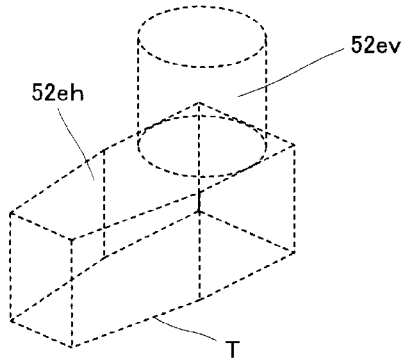
FIG. 9B is a perspective view of a through hole according to a second modification of the fourth embodiment, the through hole having a tapered part.
Figure 10A:
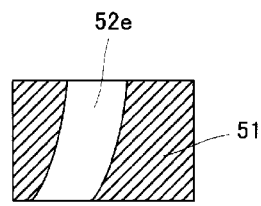
FIG. 10A is a cross-sectional view of a through hole of the through holes in the workpiece guide according to a third modification of the fourth embodiment of the disclosure, the through hole extending through the guide body from the upper surface to the lower surface of the guide body.
Figure 10B:
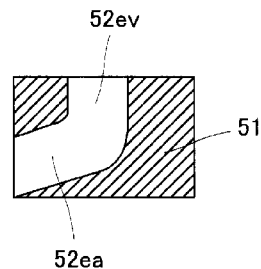
FIG. 10B is a cross-sectional view of the through hole according to a fourth modification of the fourth embodiment, the through hole extending through the guide body from the upper surface to the side surface of the guide body.
Figure 11:
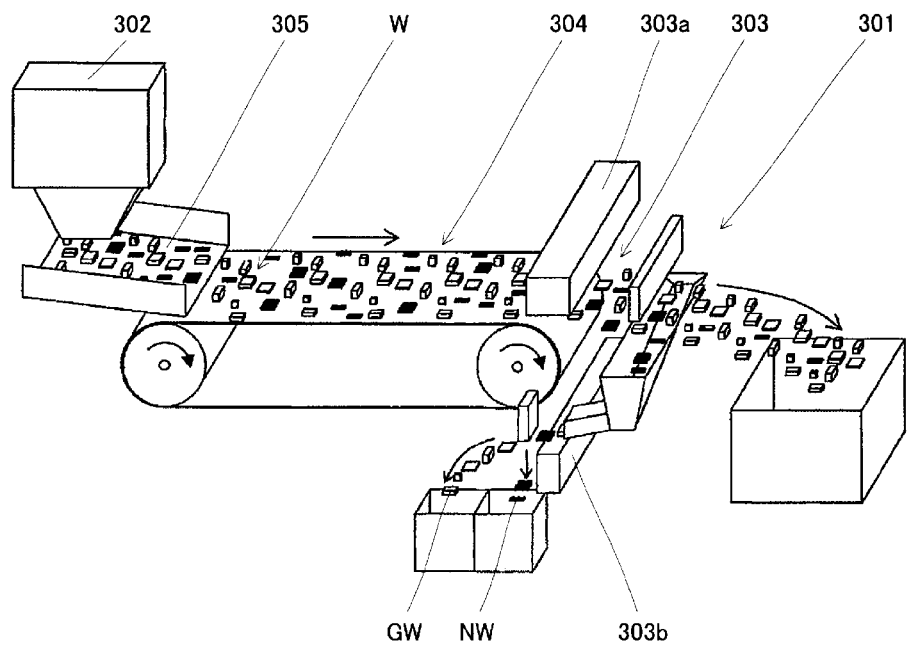
FIG. 11 is a view illustrating a configuration of a sorting apparatus including a known conveying apparatus.

FIGS. 9A and 9B are perspective views of the through hole 52e according to first and second modifications. The through hole 52e is illustrated as an example of the through holes 52a to 52i. FIGS. 10A and 10B are cross-sectional views of the through hole 52e according to third and fourth modifications, respectively.

In the first modification of the through hole 52e illustrated in FIG. 9A, the horizontal hole 52eh, which opens at the side surface and the lower surface of the guide body 51 has a curved surface R.

In this configuration, the workpieces W dropped from the second end portion of the third conveying mechanism and passed through the vertical hole 52ev come into contact with the curved surface R, which gently turns the workpieces W along the curved surface R, and then smoothly transferred to the first end portion of the second conveying mechanism.

In the above configuration, the workpieces W do not bounce while being transferred to the second conveying mechanism, and thus the workpieces W are stably positioned and conveyed in a neat row on the second conveying mechanism. Thus, a process in the area A1 is efficiently performed.

In the second modification of the through hole 52*e* illustrated in FIG. 9B, the horizontal hole 52*eh*, which has openings at the side surface and the lower surface of the guide body 51, has a tapered portion T.

The workpieces W each may have a shape including a long side and a short side. In such a case, the workpieces W, which are dropped from the second end portion of the third conveying mechanism onto the first end portion of the second conveying mechanism, are aligned along the long side by the tapered portion T and conveyed on the second conveying mechanism.

The workpieces W all aligned along the long side while being conveyed allow an efficient appearance check in the area A1, for example.

In the third modification of the through hole 52*e* in FIG. 10A, the through hole 52*e* has a gently curved overall shape and do not branch into a vertical hole and a horizontal hole. The through hole 52*e* extends through the guide body 51 from the upper surface to the lower surface.

In this configuration, as in the first modification, the workpieces W dropped from the third conveying mechanism are gently turned by the gently curved through hole 52*e* along the shape of the through hole 52*e*. Then, the workpieces W are transferred onto the first end portion of the second conveying mechanism.

As in the first modification, the workpieces W do not bounce while being transferred to the second conveying mechanism. The workpieces W are stably positioned and conveyed in a neat row on the second conveying mechanism. Thus, a process in the area A1 is efficiently performed.

In the fourth modification of the through hole 52*e* in FIG. 10B, the through hole 52*e* has a vertical hole 52*ev* and a diagonal hole 52*ea*. The through hole 52*e* extends through the guide body 51 from the upper surface to the side surface.

In this configuration, the workpieces W dropped from the third conveying mechanism are slid and turned by the diagonal hole 52*ea*. Then, the workpieces W are slid on the diagonal hole 52*es* and transferred onto the first end portion of the second conveying mechanism.

As in the first modification, the workpieces W do not bounce while being transferred to the second conveying mechanism. The workpieces W are stably positioned and conveyed in a neat row on the second conveying mechanism. This enables a process in the area A1 to be efficiently performed.

As described above, in the modifications of the through holes 52*a* to 52*i* in the guide body 51 of the workpiece guide 50 according to the fourth embodiment, the position and the orientation of the workpieces W on the second conveying mechanism are well adjusted.

While preferred embodiments of the disclosure have been described above, it is to be understood that variations and modifications will be apparent to those skilled in the art without departing from the scope and spirit of the disclosure. The scope of the disclosure, therefore, is to be determined solely by the claims.

What is claimed is:

1. A conveying apparatus comprising:
   a first conveying section including a first conveying mechanism configured to convey workpieces in a line from a first end portion to a second end portion of the first conveying mechanism at a first speed;
   a second conveying section including a second conveying mechanism configured to convey the workpieces from a first end portion to a second end portion of the second conveying mechanism at a second speed;
   a third conveying section including:
      a third conveying mechanism in a form of a slide and the slide being positioned between the second end portion of the first conveying mechanism and the first end portion of the second conveying mechanism, the third conveying mechanism being configured to allow the workpieces, which are dropped thereon from the second end portion of the first conveying mechanism, to slide from a first end portion of the third conveying mechanism to a second end portion of the third conveying mechanism such that the workpieces are transferred to the first end portion of the second conveying mechanism;
      a rotation mechanism including a rotation shaft connected to the third conveying mechanism at a position near the first end portion of the third conveying mechanism, the rotation mechanism being configured to turn the third conveying mechanism about the rotation shaft; and
      a first sensor configured to detect first information indicating that one of the workpieces has passed the second end portion of the third conveying mechanism; and
   a controller coupled to the first sensor and the rotation mechanism, wherein
   the controller is configured to receive the first information detected by the first sensor and transmit an operation command to the rotation mechanism based on the first information to turn the second end portion of the third conveying mechanism a predetermined number of degrees at a peripheral speed faster than the first speed, and
   the rotation mechanism is configured to intermittently turn the third conveying mechanism based on the operation command such that the workpieces slid to the second end portion of the third conveying mechanism from the first end portion of the third conveying mechanism are spread onto the second conveying mechanism with a predetermined distance therebetween.

2. The conveying apparatus according to claim 1, further comprising a workpieces guide including a guide body and a plurality of through holes, the guide body is positioned between the second end portion of the third conveying mechanism and the first end portion of the second conveying mechanism, the plurality of through holes extending through the guide body at least from an upper surface thereof to a lower surface thereof or from the upper surface thereof to a side surface thereof, the plurality of through holes being arranged in a substantially arced shape with a predetermined distance therebetween when viewed from above, wherein
   the rotation mechanism is configured to intermittently turn the third conveying mechanism based on the operation command such that the second end portion of the third conveying mechanism is positioned close to each of the plurality of through holes and the workpieces that have passed the second end portion of the third conveying mechanism are distributed into the plurality of through holes.

3. The conveying apparatus according to claim 2, wherein the first conveying section further includes a supply mechanism configured to supply the workpieces to the first conveying mechanism,
   the supply mechanism is coupled to the controller, and
   the controller is configured to transmit an operation command to the supply mechanism based on the first information to supply the workpieces to the first conveying mechanism, whereby the controller controls supply of the workpieces to the first conveying mechanism.

4. The conveying apparatus according to claim 2, wherein
the first conveying section further includes: a second sensor configured to detect second information indicating that the workpieces have passed a predetermined position of the first conveying mechanism; and a removing mechanism configured to remove any of the workpieces desired to be removed from the first conveying mechanism, wherein
the second sensor and the removing mechanism are coupled to the controller,
the controller is configured to receive the second information detected by the second sensor, and
if the controller receives the second information, which is transmitted from the second sensor, at a shorter time interval than a predetermined time interval, the controller transmits an operation command to the removing mechanism to remove one of the workpieces that has passed the predetermined position at the shorter time interval than the predetermined time interval, whereby the controller controls the distance between the workpieces on the first conveying mechanism.

* * * * *